United States Patent
Iwamoto et al.

(10) Patent No.: US 8,705,070 B2
(45) Date of Patent: Apr. 22, 2014

(54) SYSTEMS AND METHODS FOR MANAGING USE OF AN IMAGING DEVICE

(75) Inventors: Neil Y. Iwamoto, Mission Viejo, CA (US); Royce Earle Slick, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/404,909

(22) Filed: Feb. 24, 2012

(65) Prior Publication Data
US 2013/0222835 A1    Aug. 29, 2013

(51) Int. Cl.
*G06F 15/00*    (2006.01)

(52) U.S. Cl.
USPC ........................................................ 358/1.14

(58) Field of Classification Search
USPC ........................................................ 358/1.14
See application file for complete search history.

(56) References Cited

U.S. PATENT DOCUMENTS

| | | |
|---|---|---|
| 7,397,362 B2 | 7/2008 | Zhang |
| 2003/0012415 A1 | 1/2003 | Cossel |
| 2006/0077422 A1 | 4/2006 | Mathieson |
| 2006/0187486 A1 | 8/2006 | Tsuchitoi |
| 2007/0283447 A1 | 12/2007 | Hong |
| 2008/0005579 A1* | 1/2008 | Gaines et al. ................. 713/186 |
| 2009/0080707 A1 | 3/2009 | Djuric |

FOREIGN PATENT DOCUMENTS

GB    2331820 A    2/1999

OTHER PUBLICATIONS

David Chappell, Claims-Based Identity for Windows, Nov. 2009.
Kuan-Chieh Liao et al., A One-Time Password Scheme with QR-Code Based on Mobile Phone, 2009 Fifth International Joint Conference on INC, IMS and IDC.
B. Clifford Neuman et al., Kerberos: An Authentication Service for Computer Networks, IEEE Communications Magazine, Sep. 1994.
Tetsuji Takada et al., Awase-E: Image-based Authentication for Mobil Phones using User's Favorite Images, 2003.
VeriUser Authentication Solutions, Capella Technologies, downloaded Feb. 2011.

* cited by examiner

*Primary Examiner* — Saeid Ebrahimi Dehkordy
(74) *Attorney, Agent, or Firm* — Canon U.S.A., Inc. IP Division

(57) ABSTRACT

Systems and methods for managing access to a device configured to capture images store trust information that is generated in response to the creation of a trust relationship with an identity provider, capture an image of indicia on the device configured to capture images, wherein the indicia are provided to a user by the identity provider in response to a user authentication operation with the identity provider, determine if the indicia are valid based on the trust information, and allow operation of other functions of the device configured to capture images in response to determining that the indicia are valid or not allowing operation of the other functions of the device configured to capture images in response to determining that the indicia are invalid.

20 Claims, 12 Drawing Sheets

SYSTEMS AND METHODS FOR MANAGING USE OF AN IMAGING DEVICE

BACKGROUND

1. Field of the Disclosure

The present disclosure relates generally to managing use of imaging devices.

2. Description of the Related Art

Imaging devices (cameras, printers, copy machines, etc.) may have a variety of capabilities and functions. For example, some multi-function peripheral devices can print, scan, fax, and copy. However, it may be desirable to restrict user access to certain capabilities and functions of a device. For example, a business may desire to restrict access to a copy machine to prevent the machine from being used to make copies for non-business related matters, or a camera owner may desire to restrict access to the camera's settings to prevent other people from adjusting the settings.

SUMMARY

In one embodiment, an image acquisition device comprises a computer-readable medium configured to store trust information, wherein the trust information is received from an identity provider in response to an establishment of a trust relationship with the identity provider, and an image detector configured to capture an image, wherein the captured image includes a credential image, and wherein the credential image includes a credential issued by the identity provider and generated by the identity provider in response to a user authentication. The device further comprises one or more processors configured to cause the device to perform operations including identifying the credential in the credential image, determining if the credential is valid based on the trust information, and allowing user initiation of one or more predetermined operations by the device in response to determining that the credential is valid or disallowing user initiation of the one or more predetermined operations in response to determining that the credential is invalid.

In one embodiment, a method for performing authentication on a device configured to capture images comprises storing trust information that is generated in response to the creation of a trust relationship with an identity provider, capturing an image of authorization indicia on a device configured to capture images, wherein the authorization indicia are provided to a user by the identity provider in response to a user authorization operation with the identity provider, determining if the authorization indicia are valid based on the trust information, and allowing operation of other functions of the device configured to capture images in response to determining that the authorization indicia are valid or not allowing operation of the other functions of the device configured to capture images in response to determining that the authorization indicia are invalid.

In one embodiment, one or more computer-readable media store instructions that, when executed by one or more computing devices, cause the one or more computing devices to perform operations comprising receiving trust information from an identity provider, identifying a first credential in a first image of the first credential, and determining a user can initiate first one or more operations based on the first credential and the trust information or determining that the user cannot initiate the first one or more operations based on the first credential and the trust information.

DETAILED DESCRIPTION

Though the following description includes certain illustrative embodiments, the scope of the claims also includes alternatives, equivalents, and modifications. Additionally, the illustrative embodiments may include several novel features, and a particular feature may not be essential to practice the systems and methods described herein.

Figure 1:
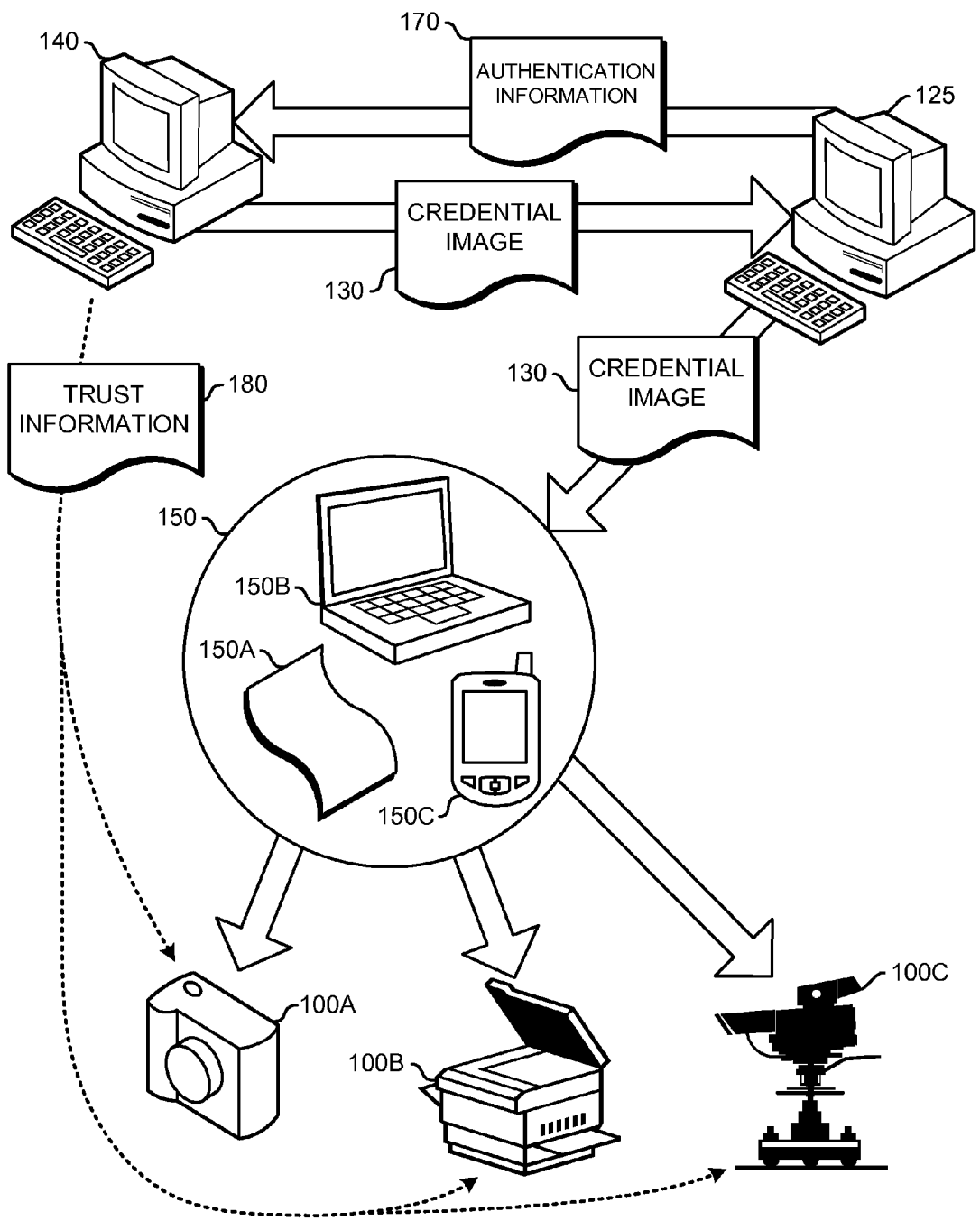
FIG. 1 illustrates an embodiment of a system for controlling use of an imaging device.

FIG. 1 illustrates an embodiment of a system for managing use of an imaging device. The system controls access to functions of the imaging device without requiring the imaging device to store any information that could identify a user, without requiring the imaging device to communicate with other devices after a trust relationship has been formed, and without requiring the addition of hardware. The system includes imaging devices 100A-C, an identity provider 140 (which may include one or more computing devices), a user computing device 125, and display media 150 (which include paper 150A, a laptop 150B, and a personal digital assistant/smartphone 150C). The identity provider 140 establishes a relationship of trust with one or more imaging devices 100 (e.g., the imaging devices 100A-C). The establishment of the trust relationship includes the sending of trust information 180 from the identity provider 140 an imaging device 100, and the respective imaging device may also send information to the identity provider 140. The operations that establish the trust relationship do not need to be repeated for each validation of a grant of permission to a user. For example, the operations that establish trust may be performed during an initial configuration, and subsequently many validation operations may be performed. Thus, an established relationship of trust can support any number of validation operations.

A user computing device 125 sends authentication information 170 to the identity provider 140 to gain permission to access an imaging device 100. Authentication information includes any information required for authentication (e.g., authentication credentials) by the imaging device 100. Examples of authentication information 170 include user-codes, passwords, passphrases, tokens, x.509 private key certificates, PINs, etc. In other embodiments, the user computing device 130 may send authorization information (e.g., authorization credentials). The identity provider 140 grants permission to access the imaging device 100 based on the authentication information 170.

In response to determining that a user is permitted to use one or more functions of an imaging device 100, the identity provider 140 generates a credential image 130 that includes an image of a credential that indicates the granting of permission by the identity provider 140 to the user to access the one or more functions of the imaging device 100. The credential image 130 may not include any information unique to a user (e.g., information that identifies a user) and may include only a credential that indicates that the identity provider 140 grants permission to the user who possesses the credential to access one or more features of the imaging device. Depending on the embodiment, the credential may include permissions, an expiration time, single use permission, multi-use permission, an imaging device identifier, a digital signature, a token, a key, a hash (e.g., a thumbprint), a certificate, etc.

The credential image 130 is then transferred to a display medium 150. A display medium may be paper 150A (e.g., the credential image may be printer on paper by a printing device), the screen of a laptop 150B, the screen of a smart phone 150C, etc. Depending on the embodiment, any medium that displays the credential image 130 and that can be read by the imaging device 100 may be used.

The imaging device 100, for example one of imaging devices 100A-C, then captures an image of the credential image 130 from the medium using the image capturing capabilities of the imaging device 100. For example, a camera 100A or 100C may take a photo of the credential image 130 as it is shown on the display medium 150. A device with a scanner, such as a multi-function peripheral device 1008, may scan the display medium 150 to capture an image of the credential image 130.

After capturing the image of the credential image 130, the image capturing device 100 then identifies the credential in the captured image and evaluates the credential based on the stored trust information 180. If the credential verifies that the user is permitted to use one or more features of the imaging device 100, the imaging device 100 then allows the user to use the one or more features. Thus, the imaging device 100 does not need to store any confidential information about a user. The identity provider 140 can perform the authorization and/or authentication of a user, and the imaging device 100 can determine the permissions granted to the holder of the credential. Therefore, an untrustworthy party cannot acquire confidential user information through physical control of an imaging device 100, and user authentication and authorization information may be modified without requiring an update at the imaging device 100, but the use of the imaging device 100 can still be restricted to desired users and/or functions. Also, the imaging device 100 may be isolated from any other computing devices (disconnected from networks, etc.), and thus be secure from attacks originating from other devices, for example attacks made via a network. Furthermore, the imaging device 100 may use its existing hardware (e.g., image capturing hardware) to receive the credential, and, thus, additional hardware (e.g., thumbprint reader, card reader, keypad) does not need to be added to the imaging device 100.

The identity provider 140 and the user computing device 125 may include any computing device, including, for example, a desktop, a laptop, a server, a mainframe, a personal digital assistant, a tablet computer, and a cellular phone (including a smart phone). Image capturing devices may include, for example, still cameras, video cameras, and scanners (including multi-function peripherals).

Figure 2:
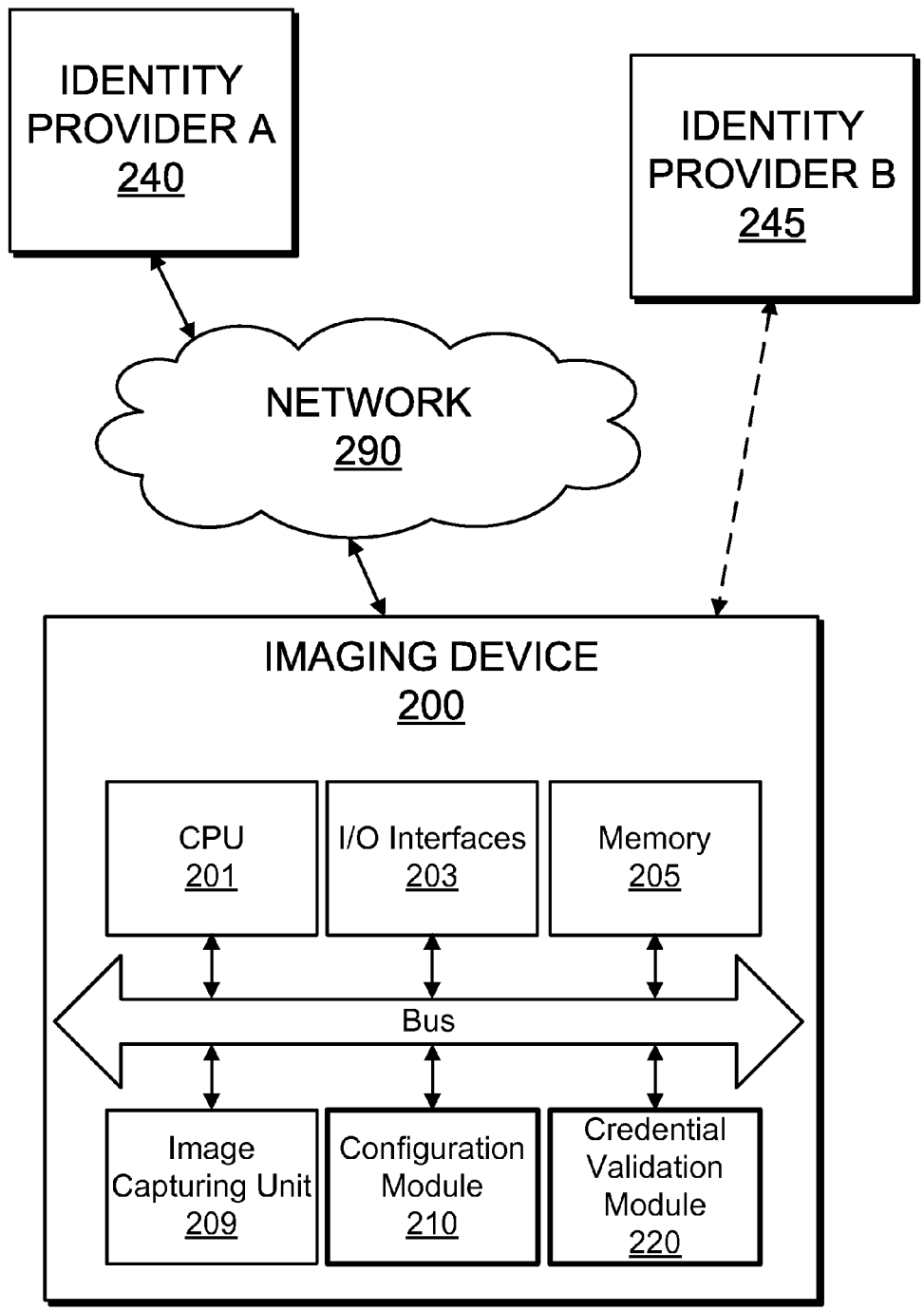
FIG. 2 illustrates an embodiment of an imaging device.

FIG. 2 illustrates an embodiment of an imaging device 200. The imaging device communicates with an identity provider, identity provider A 240, via a network 290. The network may include one or more of a LAN, a WAN, a personal area network, the Internet, a wired network, and a wireless network. After the imaging device 200 has received trust information from identify provider A 240, the imaging device 200 may be disconnected from the network 290. However, in some embodiments, a relationship of trust is established without using a network. For example, the imaging device 200 also receives and/or sends data to another identity provider, identity provider B 245, via other means than the network 290 (other means include, for example, flash drives, optical drives). Thus, an example of another means is data that is exchanged between the imaging device 200 and identity provider B 245 via a flash drive that a human connects to each device.

The imaging device includes a computer processor (CPU) 201, such as a single core or multi-core central processing unit and/or a micro-processing unit. The CPU 201 may be incorporated in a stand-alone apparatus or in a multi-component apparatus, or may include multiple processors which are constructed to work together. The CPU 201 may implement computer-executable instructions and/or control the implementation of computer-executable instructions by other members of the imaging device 200. The imaging device 200 also includes one or more I/O interfaces 203. The I/O interfaces 203 provide communication interfaces to input and output devices, which may include a keyboard, a display device, a mouse, one or more controls (e.g., buttons, switches, dials), a touch screen, a scanner, a microphone, a drive, and a network (either wired or wireless).

A memory 205 may store computer-readable data and/or computer-executable instructions. The memory 205 may include for example, one or more of a magnetic disk (e.g., a flexible disk (floppy disk), a hard disk, redundant array of independent disks (RAID)), an optical disc (e.g., CD, DVD, Blu-ray), a magneto-optical disk, a micro-drive, a read only memory (ROM), solid state memory (e.g., random access memory (RAM), DRAM, SRAM, flash memory, video RAM (VRAM), a nonvolatile memory card), erasable programmable read only memory (EPROM), electrically erasable programmable read only memory (EEPROM), a magnetic tape or card, and an optical card.

The imaging device 200 also includes an image capturing unit 209. The image capturing unit converts detected light into computer-readable data (for example, JPEG, EXIF, PDF, bitmap, a RAW format, GIF, etc.), and may include, for example, a CCD sensor, a CMOS sensor, etc. Examples of the image capturing unit 209 include the light sensing equipment (e.g., lens, sensor, shutter, aperture) in a camera (still or video) and a platen on a scanner. The members of the imaging device 200 communicate via a bus.

The imaging device 200 also includes a configuration module 210 and a credential validation module 220. A module includes instructions that may be executed by the imaging device 200 to cause the imaging device 200 to perform certain operations, though for purposes of description a module may be described as performing the operations. Modules may include logic, computer-readable data, and/or computer-executable instructions and may be implemented in software (e.g., Assembly, C, C++, C#, Java, BASIC, Perl, Visual Basic), firmware, and/or hardware. In other embodiments, the imaging device 200 may include additional or less modules, the modules may be combined into fewer modules, or the modules may be divided into more modules. The configuration module 210 and/or the credential validation module 220 may be executed by the imaging device 200 to implement the methods described herein.

For example, the configuration module 210 may be executed to cause the imaging device 200 to create a relationship of trust with an identity provider. Creation of a relationship of trust may include entering a configuration mode and receiving trust information (e.g., a token, a certificate, a signature, a cryptographic key) from an identity provider. The trust information may be received via the network 290 or via non-network means (e.g., CD, flash drive, manual entry, image capturing).

Also, the credential validation module 220 may be executed to cause the imaging device 200 to capture an image of a credential using the image capturing unit 209. The credential may be extracted from the captured image and evaluated based on the trust information to determine if the credential is valid. If the credential validation module 220 determines that the credential is valid, the imaging device 200 allows a user to use one or more functions of the imaging device 200 (e.g., print a page, capture a still image, capture a video, erase stored information, change print settings, change image capture settings). If the credential is determined to be invalid, the imaging device 200 may prevent activation of or disable one or more functions.

Figure 3:
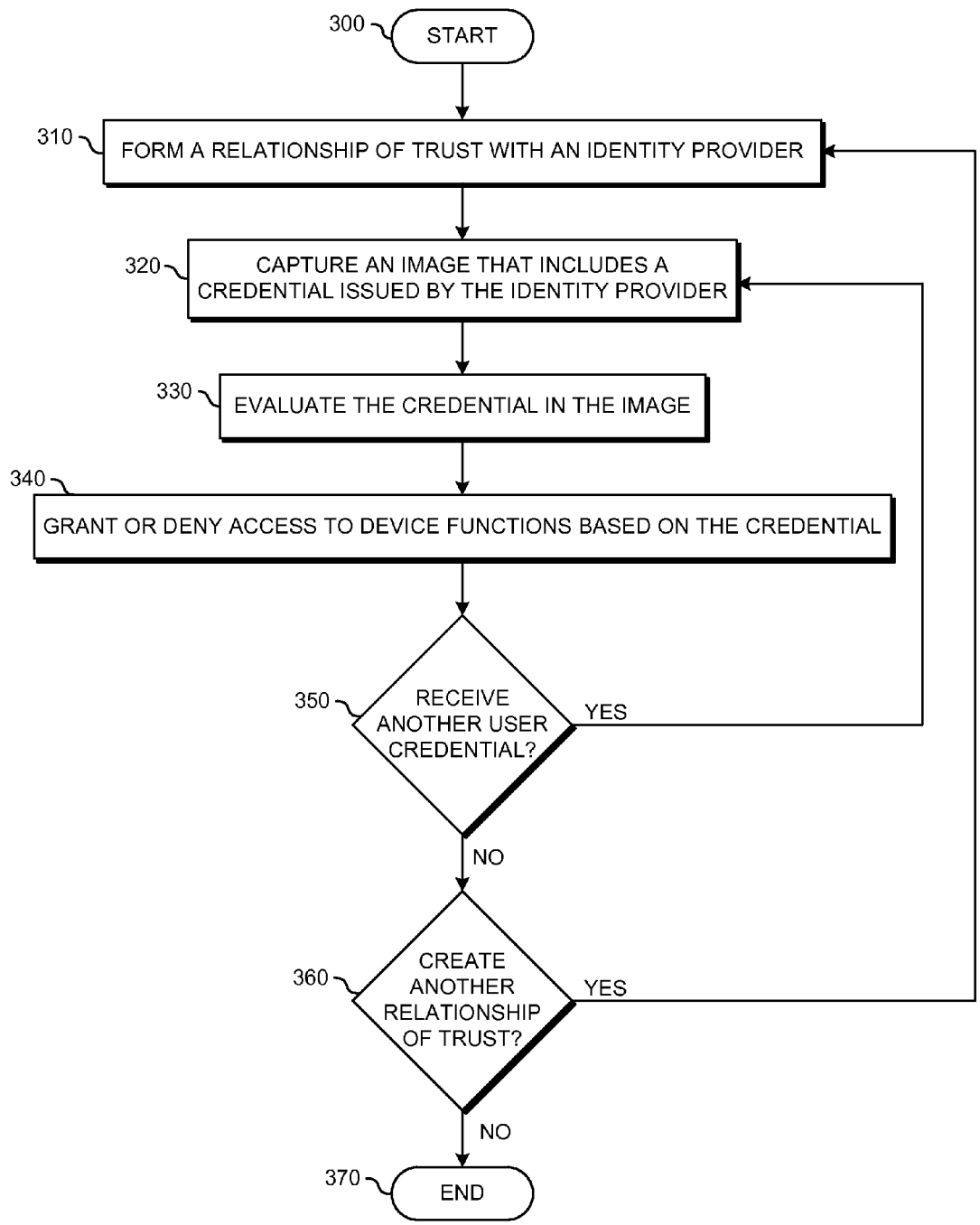
FIG. 3 is a block diagram that illustrates an embodiment of a method for controlling use of an imaging device.

FIG. 3 is a block diagram that illustrates an embodiment of a method for controlling use of an imaging device. Other embodiments of this method and the other methods described herein may omit blocks, add blocks, change the order of the blocks, combine blocks, and/or divide blocks into separate blocks. Additionally, one or more components of the systems and devices described herein may implement the method shown in FIG. 3 and the other methods described herein.

Flow begins in block 300, for example in response to a received input (activation of a control, etc.), and then proceeds to block 310, where an imaging device forms a relationship of trust with an identity provider. Forming the relationship of trust includes receipt of trust information from the identity provider by the imaging device. In some embodiments, the trust information is added at the time the imaging device is manufactured, and is thus already stored in the imaging device when the device is activated for the first time. In some embodiments, the first time the imaging device is activated it enters a configuration state and awaits the receipt of trust information. Received trust information is stored on the imaging device, and trust information may be received from one or more identity providers. Flow then proceeds to block 320.

In block 320, the imaging device captures an image that includes a credential issued by the identity provider. The image is captured using an image capturing unit of the device, and the image may be captured in response to a user command (e.g., activation of a control on the imaging device). The function that captures the image that includes the credential may be the only function of the imaging device that a user may initiate without providing a credential to the imaging device. Flow then proceeds to block 330, where the imaging device evaluates the credential in the image. The imaging device may identify an image of the credential in the image, extract the credential from the image, and evaluate the credential based on the trust information in order to determine if the credential is valid. The imaging device may identify and/or extract the credential using, for example, scale-invariant feature transform (SIFT), compressed histogram of oriented gradients (CHOG), edge orientation histograms, shape contexts, edge detection, speeded up robust features (SURF), grammars, shading, and/or a three-dimensional histogram of gradients, as well as other techniques and/or algorithms. The imaging device may use, for example, barcode readers (including linear barcodes and matrix barcodes), hologram readers, Optical Text Recognition, etc. The image of the credential may include a bar code (e.g., linear barcode, matrix barcode), plaintext, a photo, a watermark, microtext, etc., and may encrypt information. The credential image may also include one or more of an alphanumeric identifier that a user can write (e.g., on a sheet of paper), an authorization number that a person can write, a one-time password that a person can write, and a badge (e.g., ID badge).

The extracted credential is then evaluated based on the trust information, which may include comparing the credential to the trust information (e.g., determining if the credential matches the trust information), decrypting the credential using the trust information, hash comparison, etc. The results of the evaluation indicate one or more of the validity of the credential, the permissions (including access to device functions) granted to the holder of the credential, a time stamp, a time limit, and the identity provider that issued the credential.

Flow then proceeds to block 340, where the imaging device determines whether to grant or deny access to device functions based on the credential. For example, if a credential is valid a user may be granted access to all functions of the device, the grant of access may last for a predetermined period of time, the grant of access may allow a user to initiate the performance of a function by the device only once per validation of the credential, or the user may be allowed to use a subset of the functions. Functions may include, for example, a print, a copy, an image capture (e.g., a scan, a still photo), a video capture, a black-and-white print or image capture, a color print or image capture, an ISO adjustment, a resolution adjustment, a print quality adjustment, a shutter speed adjustment, a zoom adjustment, an aperture adjustment, stapling printed pages, duplex printing, image preview, image filter effects, image correction, image format selection, video frame rate selection, etc. The user may then initiate the allowed functions.

Flow then proceeds to block 350, where the imaging device determines if another credential is to be received. If yes, then flow returns to block 320. If no, then flow proceeds to block 360, where the imaging device determines if another relationship of trust is to be created. For example, an administrator of the device may desire to configure the device with multiple relationships of trust with respective identity providers. If yes, then flow returns to block 310, and if no, then flow proceeds to block 370.

Figure 4:
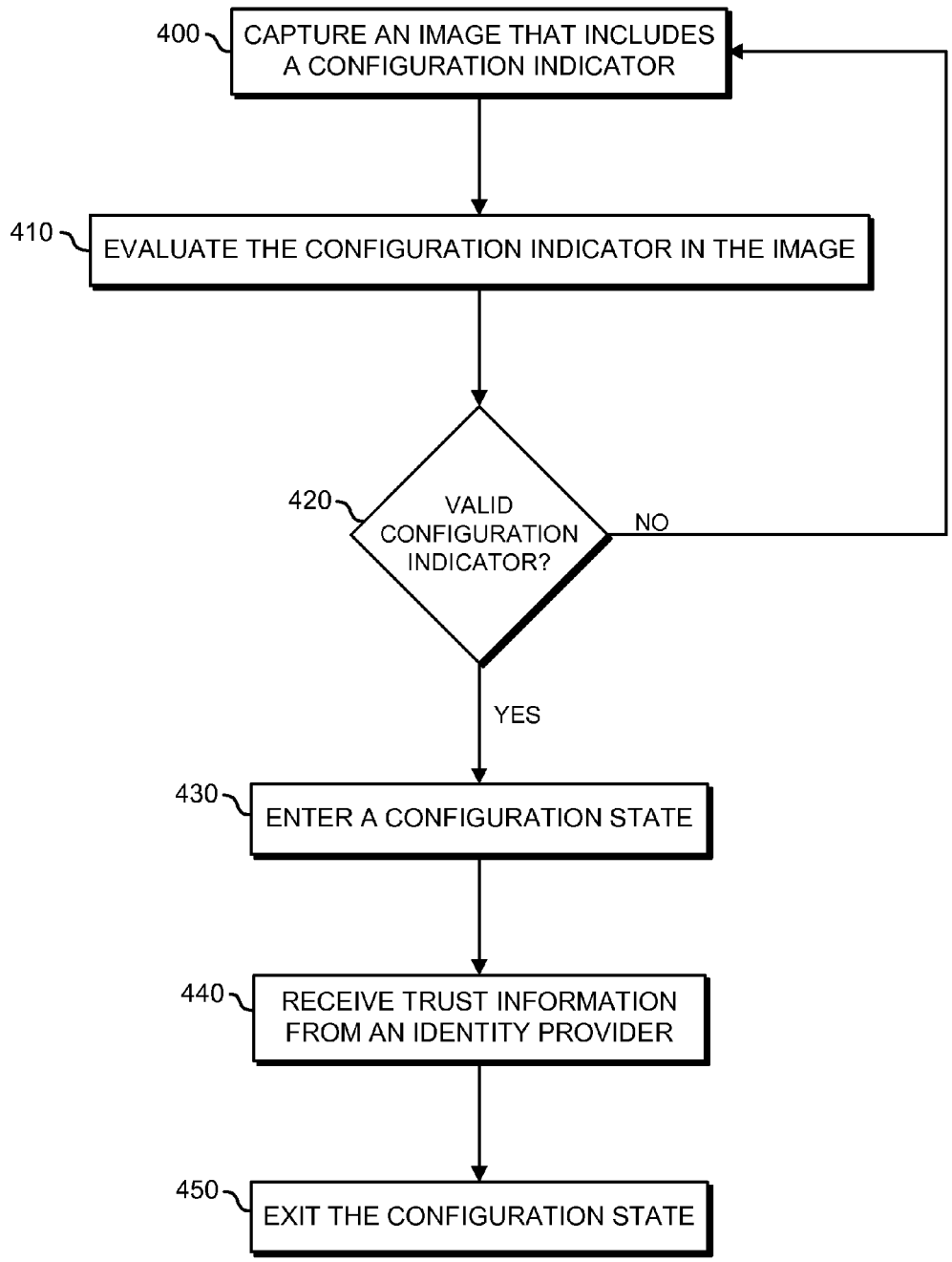
FIG. 4 is a block diagram that illustrates an embodiment of a method for configuring an imaging device.

FIG. 4 is a block diagram that illustrates an embodiment of a method for configuring an imaging device. Flow begins in block 400, where an imaging device captures an image that includes a configuration indicator. Next, flow proceeds to block 410, where the configuration indicator in the image is identified, extracted, and/or evaluated. Flow then proceeds to block 420, where the imaging device determines if the configuration indicator is valid. The determination may include comparing the configuration indicator with configuration information (which may be added to the imaging device at the time of manufacture (e.g., added to a memory), and may be customized for the particular imaging device). If the configuration indicator is not valid, flow proceeds back to block 400, where the imaging device waits to capture another image that includes a configuration indicator.

If the configuration indicator is valid, flow proceeds to block 430, where the imaging device enters a configuration state. In the configuration state, the imaging device is able to enter a trust relationship with an identity provider. Flow then proceeds to block 440, where trust information is received from an identity provider. In some embodiments, information is exchanged between the imaging device and the identity provider (e.g., device identifiers, device location, device configuration information, device settings). Flow then proceeds to block 450, where the imaging device exits the configuration state. For example, the imaging device may exit the configuration state in response to a command (e.g., from a user input, from software), an expiration of a timer, or the successful completion of the formation of a relationship of trust.

Figure 5:
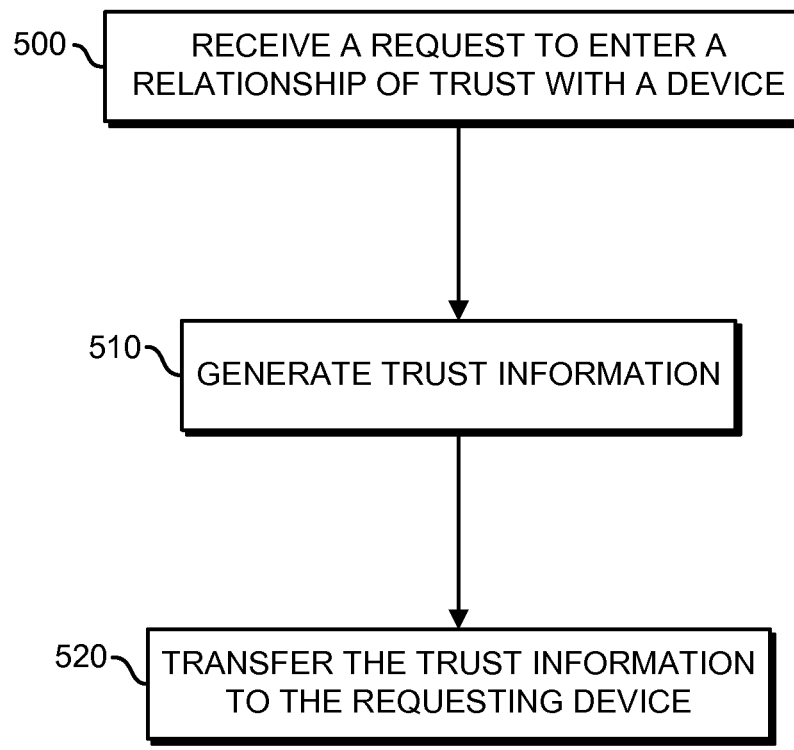
FIG. 5 is a block diagram that illustrates an embodiment of a method for entering a trust relationship.

FIG. 5 is a block diagram that illustrates an embodiment of a method for entering a trust relationship. The method may be performed by, for example, a computing device associated with an identity provider (e.g., identity provider 140). Flow starts in block 500, where a request to enter a relationship of trust with a device (e.g., an imaging device) is received (e.g., by the identity provider). The request may include an identifier for the imaging device, information indicating the capabilities of the imaging device, etc. Flow then proceeds to block 510, where trust information is generated. Flow then proceeds to block 520, where trust information is sent to the requesting device. The trust information may be sent by, for example, one or more of a network, a drive (e.g., external hard drive, USB drive, optical drive), a print medium, a peripheral device, and manual transmission.

Figure 6:
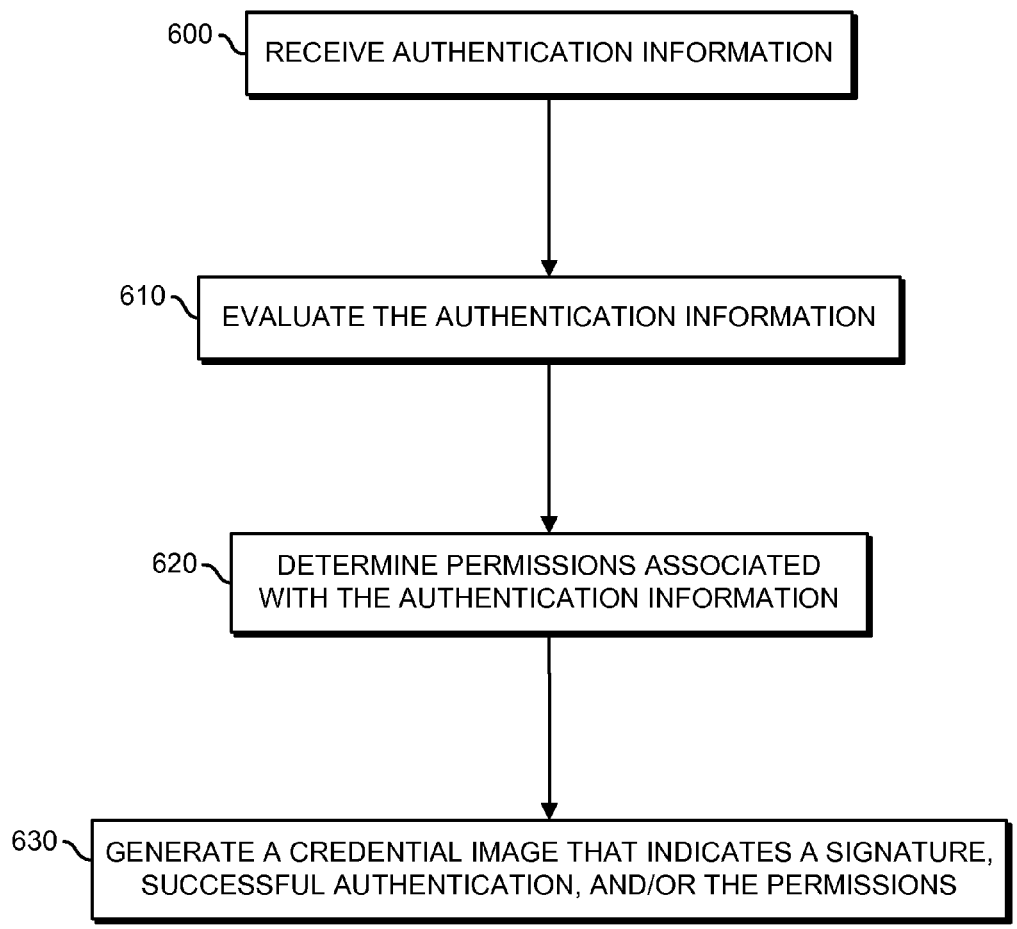
FIG. 6 is a block diagram that illustrates an embodiment of a method for generating a credential image.

FIG. 6 is a block diagram that illustrates an embodiment of a method for generating a credential image. Flow starts in block 600, where authentication information is received. For example, an identity provider may receive authentication information from a user device. Flow then proceeds to block 610, where the authentication information is evaluated. The evaluation determines if the authentication information is valid, and may include one or more of authentication and authorization. If the authentication information is valid, then flow proceeds to block 620, where the permissions associated with the authentication information are determined. The permissions may be based on the user identifier, the device, the received credentials, etc. For example, a particular user identity may be associated with certain permissions, a particular device may allow a user to initiate performance of only certain operations, or configuration permissions may be permitted only if certain credentials are provided. After the permissions are determined, flow then proceeds to block 630, where a credential image is generated. The credential image indicates one or more of a signature of the identity provider, a successful authentication/authorization, and one or more permissions. The credential image is then sent to a user device (which may transfer the credential image to a display medium).

Figure 7:
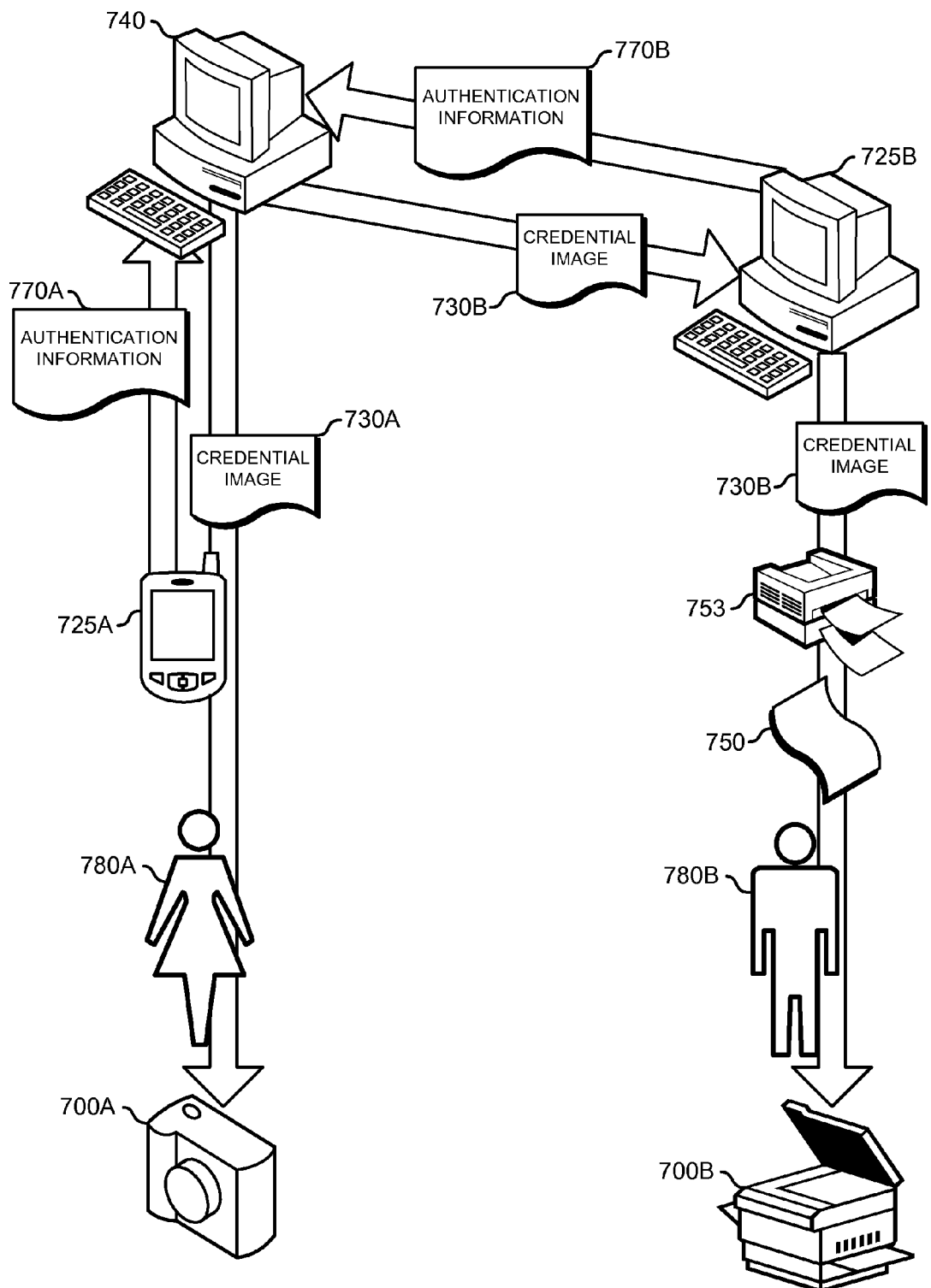
FIG. 7 is a block diagram that illustrates embodiments of systems for controlling use of an imaging device.

FIG. 7 is a block diagram that illustrates embodiments of systems for controlling use of an imaging device. The identity provider 740 has previously entered into a relationship of trust with a first imaging device 700A and a second imaging device 700B. The identity provider 740 receives authentication information 770A from a first user computing device 725A and receives second authentication information 770B from a second user computing device 725B. In response to receiving the first authentication information 770A, the identity provider 740 determines if the first authentication information 770A grants the user providing the authentication information 770A access to one or more functions of the first imaging device 700A. If yes, the identity provider 740 generates a first credential that indicates the granted permissions, generates a first credential image 730A, and sends the first credential image 730A to the first user computing device 725A. The first user computing device 725A is capable of displaying the first credential image 730A on a display screen. Thus, the display screen may be used as a display medium. A first user 780A may then position the display screen of the first user computing device 725A within range of the image capturing unit of the first imaging device 700A, which in this embodiment is a camera, and display the first credential image 730A on the display screen. The first imaging device 700A then captures an image of the display screen while the display screen displays the first credential image 730A. The image may be captured in response to user activation of a control on the first imaging device 700A. After capturing the image of the credential image, the first imaging device 700A then extracts and validates the credential. In response to determining that the credential is valid, the first imaging device 700A permits user initiation of one or more functions.

In response to receiving the second authentication information 770B, the identity provider 740 determines if the second authentication information 770B grants the user providing the authentication information 770B access to one or more functions of the second imaging device 700B. If yes, the identity provider 740 generates a second credential image 730B and sends the second credential image 730B to the second user computing device 725B. The second user computing device 725B then sends the second credential image 730B to a printing device 753, and the printing device 753 prints the second credential image 730B on a display medium 750. A second user 780B positions the display medium 750 within range of the image capturing unit of the second imaging device 700B, which in this embodiment is a multi-function peripheral device. The second imaging device 700B then captures an image of the display medium 750. The image may be captured in response to user activation of a control on the second imaging device 700B. After capturing the image of the second credential image 730B, the second imaging device 700B then extracts and validates the second credential. In response to determining that the second credential is valid, the second imaging device 700B permits user initiation of one or more functions.

Thus, the first imaging device 700A and the second imaging device 700B do not need to store any information unique to a user or to communicate with other devices via means other than an image capturing unit of the respective imaging device, yet the first imaging device 700A and the second imaging device 700B may restrict use of one or more of the device functions to certain users. Permission for a user to initiate imaging device functions may be granted, revoked, changed, etc., without updating an imaging device.

Furthermore, in some embodiments the first credential image 730A may be used to gain permission to use the second imaging device 700B and/or other devices, and the second credential image 730B may be used to gain permission to use the first imaging device 700A and/or other devices. Also, in some embodiments, a credential image may indicate a certain imaging device or certain imaging devices (e.g., a list of included devices, a list of excluded devices) and limit a grant of permission to the indicated devices.

Figure 8:
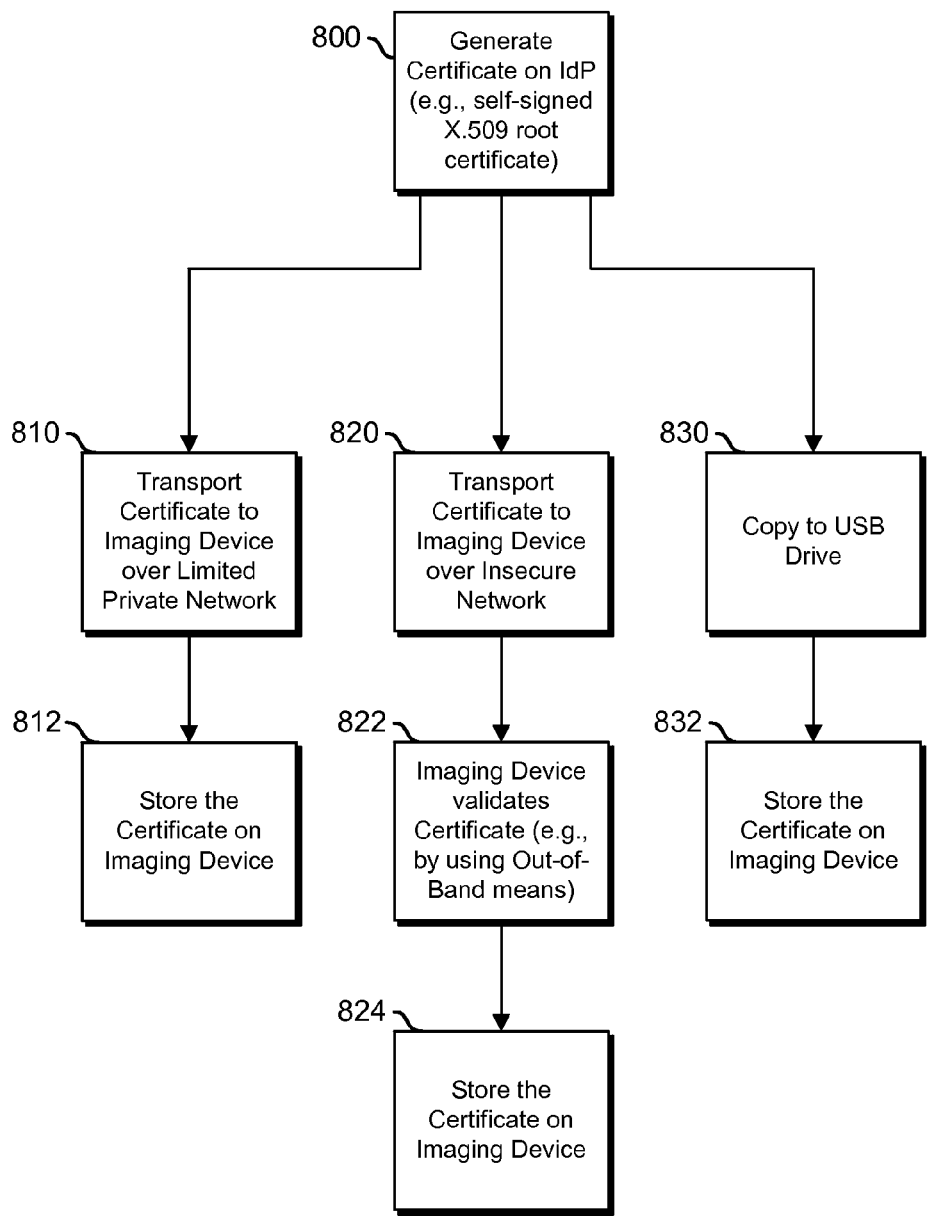
FIG. 8 is a block diagram that illustrates embodiments of methods for forming a relationship of trust.

FIG. 8 is a block diagram that illustrates embodiments of methods for forming a relationship of trust. Some of the embodiments shown in FIG. 8 may use self-signed certificates for the initial trust setup. First, in block 800, a certificate is generated by an identity provider (also referred to herein as an "IdP"). For example, the certificate may be a self-signed X.509 root certificate. Depending on user preferences and the configuration and/or capabilities of the devices (e.g., identity provider(s), network device(s), imaging device(s)), in some embodiments flow then proceeds to block 810. In block 810, the certificate is transported to an imaging device over a limited private network (e.g., a private network connected to only the identity provider and the imaging device). Flow then proceeds to block 812, where the certificate is stored on the imaging device.

Also, in some embodiments flow proceeds from block 800 to block 820. In block 820, the certificate is transported to the imaging device over an insecure network. Next, in block 822, the imaging device validates the certificate (e.g., using out-of-band means, including, for example, telephone, paper mail, and other electronic means separate from the means used to transport the certificate). For example, a thumbprint (e.g., hash) of the certificate may be obtained by a user and/or the imaging device through different means than the means that were used to transport the certificate. Since an insecure network was used to transport the certificate, the hash could be transported via a USB drive or transmission on a different network, for example. The thumbprint received via the other means could be compared with the thumbprint of the received certificate to validate the received certificate. Finally, in block 824, the certificate is stored on the imaging device.

In other embodiments, flow proceeds from block 800 to block 830, where the certificate is copied to a USB drive (or other computer-readable medium). The USB drive may then be connected to the imaging device and, in block 832, the certificate is transferred to and stored on the imaging device.

Figure 9:
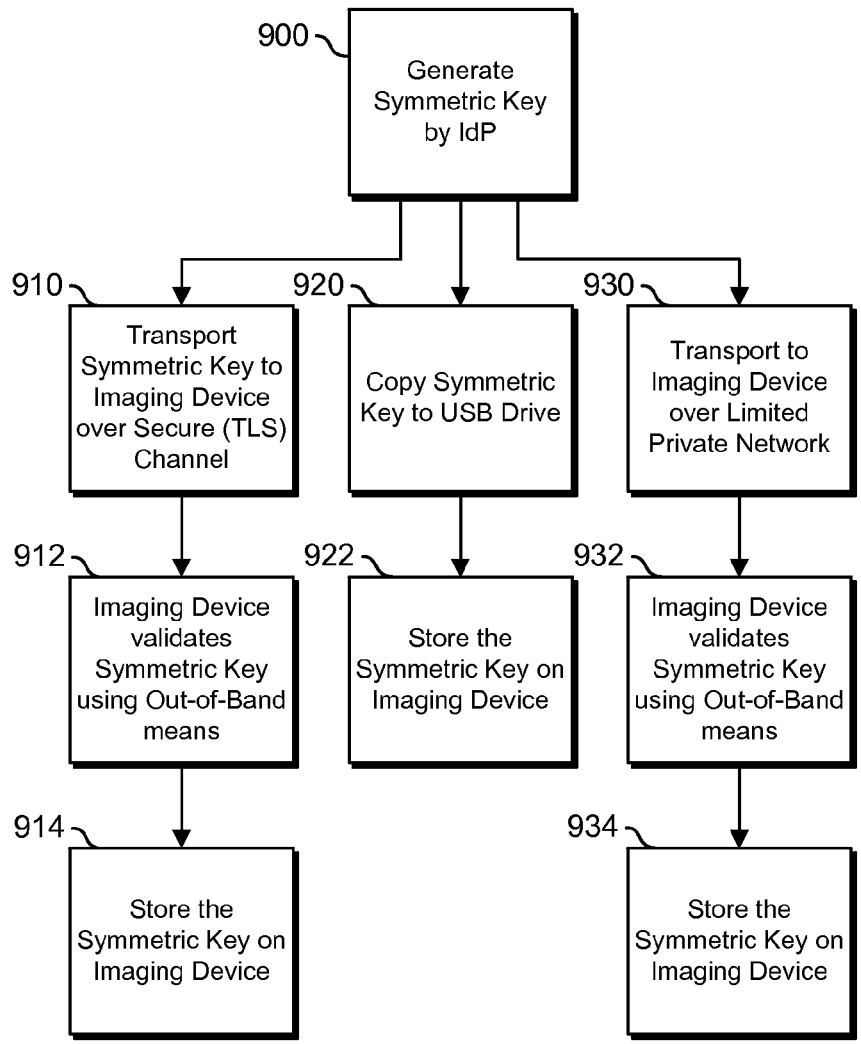
FIG. 9 is a block diagram that illustrates embodiments of methods for forming a relationship of trust.

FIG. 9 is a block diagram that illustrates embodiments of methods for forming a relationship of trust. Some of the embodiments may use a symmetric key as a credential to setup the trust relationship. In FIG. 9, flow starts in block 900, where a symmetric key is generated by an IdP. Then, in some embodiments, flow proceeds to block 910, where the symmetric key is transported to the imaging device over a secure channel (e.g., using transport layer security). Next, in block 912 the imaging device validates the symmetric key using out-of-band means. If the symmetric key is valid, the imaging device stores the symmetric key in block 914.

In some embodiments, flow moves from block 900 to block 920. In block 920, the symmetric key is copied to a USB drive (e.g., a flash drive) or other computer-readable medium. The USB drive is then transported to the imaging device and connected to the imaging device. The imaging device then copies the symmetric key from the USB drive and stores the symmetric key.

Also, in some embodiments, flow proceeds from block 900 to block 930. In block 930, the symmetric key is transported to the imaging device over a limited private network. Next, in block 932, the imaging device validates the symmetric key using out-of-band means. Afterwards, in block 934 the imaging device stores the symmetric key.

Figure 10A:
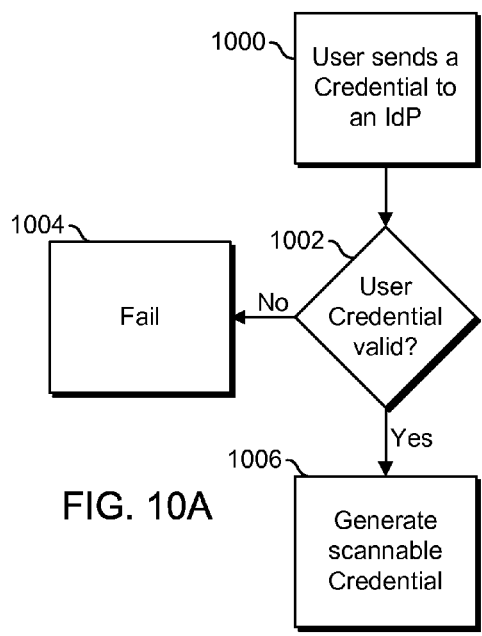
FIGS. 10A-10C are block diagrams that illustrate embodiments of methods for generating credentials.
Figure 10B:
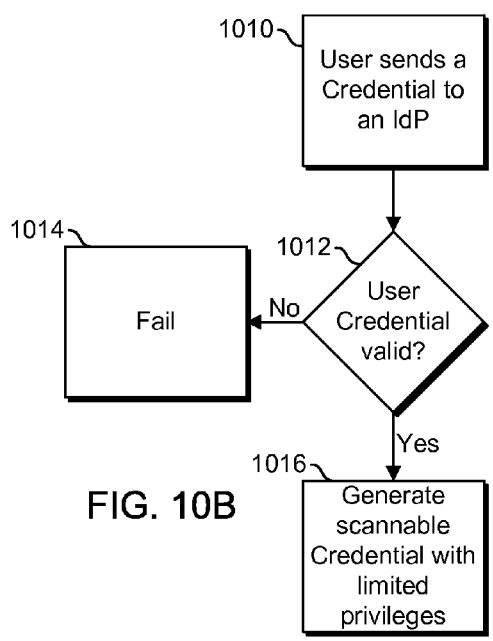
Figure 10C:
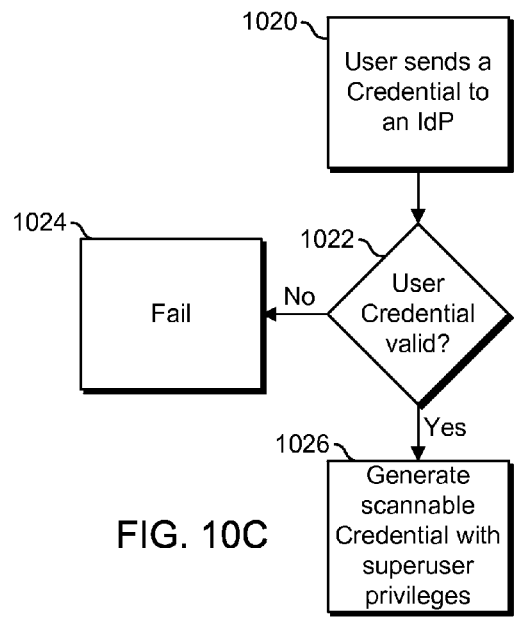

FIGS. 10A-10C are block diagrams that illustrate embodiments of methods for generating credentials. In FIG. 10A, flow starts in block 1000, where a user sends a credential to an IdP. Flow then proceeds to block 1002, where the IdP determines if the user credential is valid. If the credential is not valid, flow proceeds to block 1004, where the authentication and/or authorization fail. If the credential is valid, flow proceeds to block 1006, where a scannable (e.g., capable of being captured by an imaging device) credential is generated. The generated credential is then sent to the user (e.g., the user computing device).

In FIG. 10B, flow starts in block 1010, where a user sends a credential to an IdP. Flow then proceeds to block 1012, where the IdP determines if the user credential is valid and determines the privileges granted by the credential. If the credential is not valid, flow proceeds to block 1014, where the authentication and/or authorization fail. If the credential is valid, flow proceeds to block 1016, where a scannable credential is generated. The scannable credential grants the holder of the credential limited privileges, and thus the holder of the credential can access only a subset of the functions of the imaging device. The generated credential is then sent to the user.

In FIG. 10C, flow starts in block 1020, where a user sends a credential to an IdP. Flow then proceeds to block 1022, where the IdP determines if the user credential is valid and determines the permissions granted by the credential. If the credential is not valid, flow proceeds to block 1024, where the authentication and/or authorization fail. If the credential is valid, flow proceeds to block 1026, where a scannable credential is generated. The scannable credential grants the holder of the credential superuser privileges, and thus may grant the holder of the credential access to all of the functions and settings of the imaging device. The generated credential is then sent to the user.

Figure 11:
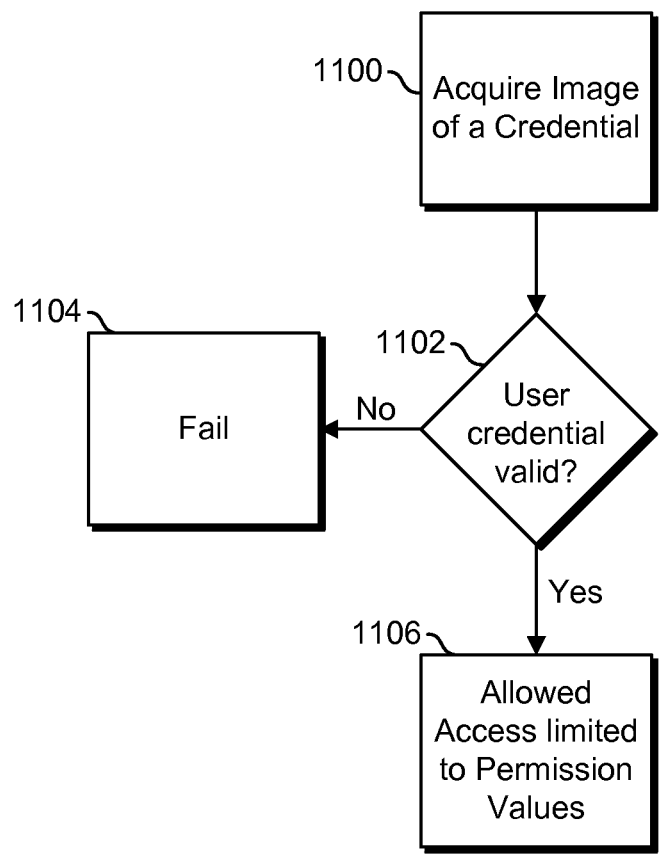
FIG. 11 is a block diagram that illustrates an embodiment of a method for controlling use of an imaging device.

FIG. 11 is a block diagram that illustrates an embodiment of a method for controlling use of an imaging device. Flow starts in block 1100, where an imaging device acquires an image of a credential. Next, in block 1102, the imaging device determines if the credential is valid, based on the stored trust information and the image of the credential. If the credential is not valid, then flow proceeds to block 1104, where the attempt to access the functions of the imaging device fails. If the credential is valid, then flow proceeds to block 1106, where access is allowed to one or more functions of the imaging device. The allowed functions may be limited by permissions (e.g., limited, normal, superuser) in the credential.

Figure 12:
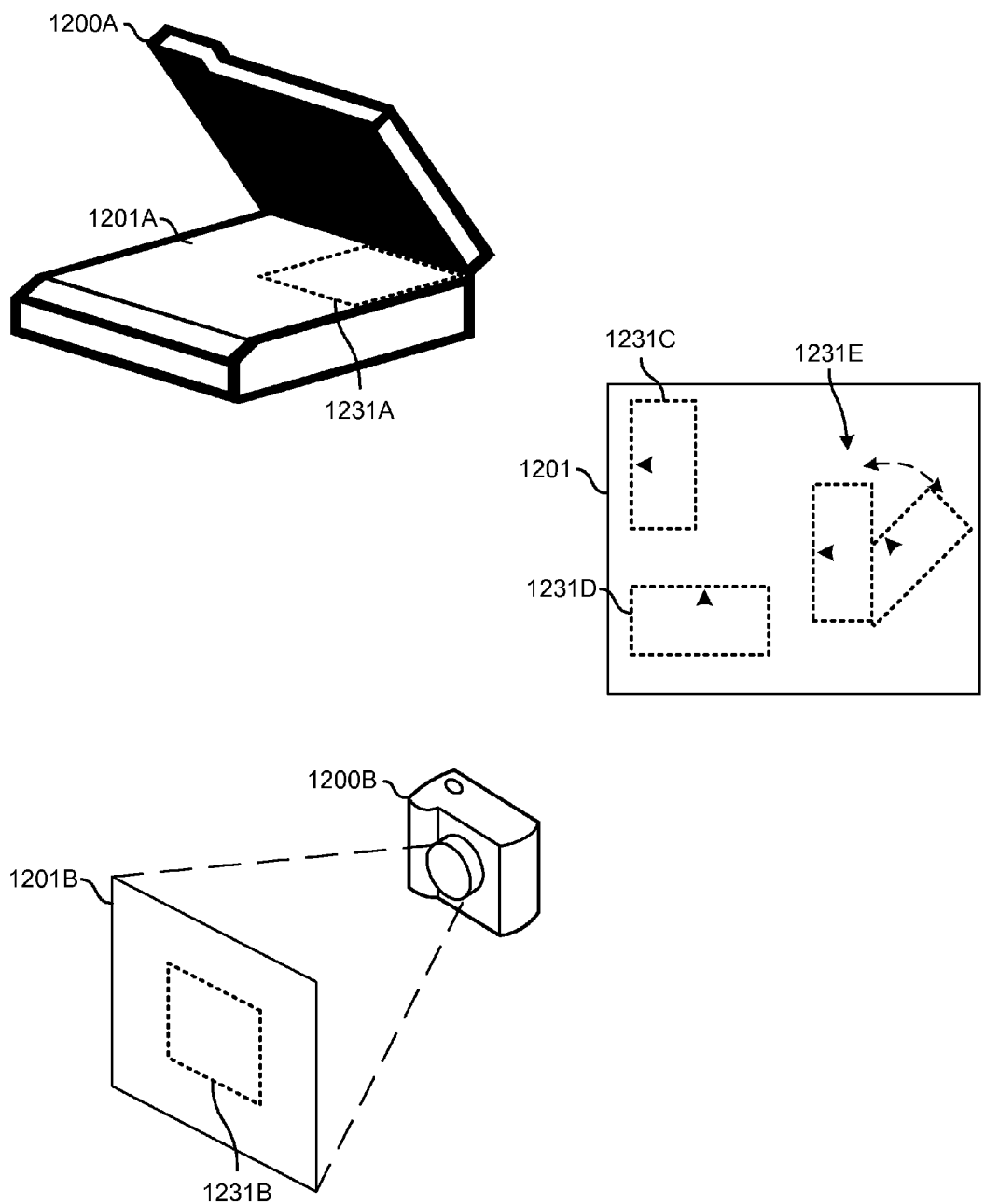
FIG. 12 illustrates embodiments of imaging devices.

FIG. 12 illustrates embodiments of imaging devices 1200. An imaging device 1200 is configured to detect a credential at a certain position 1231 (e.g., location, orientation, area that is a sub-set of the field of view) within a field of view 1201 of the imaging device 1200. A first imaging device 1200A includes a scanner, and is configured to detect a credential image at a specified position 1231A in a field of view 1201A of a scanning surface. A second imaging device 1200B includes a camera, and is configured to detect a credential image at a specified position 1231B in a field of view 1201B of the camera. Example positions that include orientation of the credential include position 1231C, in which the top of the credential is indicated by the direction the arrow is pointing (left side of the page), and position 1231D, in which the top of the credential is indicated by the direction the arrow is pointing (top of the page). Also, an imaging device 1200 may be configured to detect a credential with a range of orientations, for example the range shown by position 1231E. The required position of a credential may be indicated in information sent to a user with an image of the credential.

Detecting the credential in a specified position may allow extra capabilities (e.g., color scanning, increased resolution) to be added to a part of the imaging device 1200 (the part that captures the specified position in the field of view 1201) and be omitted from the other parts of the imaging device, which may reduce costs. Also, detecting the credential in the specified position may enhance security, since an unintended user who acquires the credential image (e.g., finds a paper with the image on it) may not know where to position the credential image in the field of view 1201, and thus may not be able to validate the credential and gain access to the functions of the imaging device 1200. Also, the position may change for successive credentials. For example, the credential itself may indicate to the imaging device the position in the field of view where the credential should be placed, which may prevent a position from being re-used for different credentials and thus make it difficult for an observer to identify a position to place a credential. Additionally, once an image of a credential has been captured that includes the credential at an incorrect position, the credential may no longer be accepted by the imaging device 1200 (preventing repeated image capturing attempts from successfully validating the credential), or the imaging device 1200 may allow a limited number of attempts.

The above described devices, systems, and methods can be achieved by supplying one or more storage media that store thereon computer-executable instructions for realizing the above described operations to one or more devices that are configured to read the computer-executable instructions stored in the one or more storage media and execute them. In this case, the one or more devices perform the operations of the above-described devices, systems, and methods when executing the computer-executable instructions read from the one or more storage media. Also, an operating system on the one or more systems and/or devices may implement one or more of the operations of the above described devices, systems, and methods. Thus, the computer-executable instructions and/or the one or more storage media storing the computer-executable instructions thereon constitute an embodiment.

Any applicable computer-readable storage medium (e.g., a magnetic disk (including a floppy disk and a hard disk), an optical disc (including a CD, a DVD, a Blu-ray disc), a magneto-optical disk, a magnetic tape, and a solid state drive (including flash memory, DRAM, SRAM)) can be employed as a storage medium for the computer-executable instructions. The computer-executable instructions may be written to a computer-readable storage medium provided on a function-extension board inserted into a device or on a function-extension unit connected to a device, and a CPU provided on the function-extension board or unit may implement the operations of the above-described devices, systems, and methods.

While the above disclosure describes illustrative embodiments, the invention is not limited to the above disclosure. To the contrary, the invention covers various modifications and equivalent arrangements within the scope of the appended claims.

What is claimed is:

1. An image acquisition device comprising:
   a computer-readable medium configured to store trust information, wherein the trust information is received from an identity provider in response to an establishment of a trust relationship with the identity provider;
   an image detector configured to capture an image, wherein the captured image includes a credential image, and wherein the credential image includes a credential issued by the identity provider and generated by the identity provider in response to a user authentication; and
   one or more processors configured to cause the device to perform operations including
      receiving the trust information from an identity provider device;
      capturing an image of a credential on a display medium, wherein the image of the credential was formed on the display medium by another device;
      identifying the credential in the image of the credential;
      determining if the credential is valid based on the trust information; and
      allowing user initiation of one or more predetermined operations by the device in response to determining that the credential is valid or disallowing user initiation of the one or more predetermined operations in response to determining that the credential is invalid.

2. The device of claim 1, wherein the image acquisition device includes one or more of a scanner, a camera, tablet PC, smartphone.

3. The device of claim 1, wherein the one or more predetermined operations include one or more of printing, copying, faxing, and image capturing operations.

4. The device of claim 1, wherein the credential includes one or more of a digital signature and a symmetric key.

5. The device of claim 1, wherein the image acquisition device is configured to stop electronic communication with the identity provider after the trust information is received.

6. The device of claim 1, wherein the image of the credential includes the credential in one or more of a one dimensional barcode and a matrix barcode.

7. The device of claim 6, wherein the credential indicates one or more of a user identity, permissions, an expiration time, single use permission, multi-use permission, a device number, a list of permitted devices, a list of excluded devices, and a digital signature.

8. The device of claim 1, wherein the image of the credential includes one or more of a watermark, a hologram, and microtext.

9. The device of claim 1, wherein the processors are further configured to perform operations comprising refusing storage of the image of the credential.

10. A method for managing access to a device configured to capture images, the method comprising:
    storing trust information at a first device configured to capture images, wherein the trust information is generated in response to the creation of a trust relationship with an identity provider;
    capturing an image of indicia on a display medium with the first device configured to capture images, wherein the indicia are provided to a second device by the identity provider in response to a user authentication operation with the identity provider, and wherein the second device forms the image of the indicia on the display medium;
    determining if the indicia are valid based on the trust information; and
    allowing operation of other functions of the first device configured to capture images in response to determining that the indicia are valid or not allowing operation of the other functions of the first device configured to capture images in response to determining that the indicia are invalid.

11. The method of claim 10, further comprising:
    capturing an image of configuration indicia;
    identifying the configuration indicia; and
    accepting the trust information from an identity provider in response to identifying the configuration indicia.

12. The method of claim 11, wherein the trust information includes at least one of a key and a certificate.

13. The method of claim 12, wherein determining if the indicia is valid based on the trust information includes using a key to decrypt the indicia.

14. The method of claim 10, further comprising receiving the trust information from the identity provider in response to a user authorization operation performed by the identity provider.

15. The method of claim 10, wherein the display medium is one of a sheet of paper, a display, and a card.

16. One or more non-transitory computer-readable media storing instructions that, when executed by one or more computing devices, cause the one or more computing devices to perform operations comprising:
    receiving trust information from an identity provider;
    capturing a first image of a credential on a display medium, wherein the first image was formed on the display medium by another device;

identifying a first credential in the first image that indicates the first credential; and determining a user can initiate first one or more operations based on the first credential and the trust information or determining that the user cannot initiate the first one or more operations based on the first credential and the trust information.

17. The computer-readable media of claim 16, wherein the first one or more operations are associated with first predetermined permissions, and wherein determining a user can initiate the first one or more operations based on the first credential includes determining that the first credential includes the first predetermined permissions.

18. The computer-readable media of claim 16, wherein the operations further comprise:

identifying a second credential in a second image on a second display medium; and determining a user can initiate one or more additional operations based on the second credential and the trust information or determining that the user cannot initiate the one or more additional operations based on the second credential and the trust information.

19. The computer-readable media of claim 16, wherein the operations further comprise:

entering a configuration state in response to identifying configuration indicia in an image of the configuration indicia, wherein the trust information is received from the identity provider while in the configuration state; and exiting the configuration state, wherein further trust information is not accepted while not in the configuration state.

20. The computer-readable media of claim 16, wherein the operations further comprise:

determining a position of the first credential within the first image, and determining if the position of the first credential is within a predetermined range of positions, and wherein determining a user can initiate the first one or more operations is further based on whether or not the first credential is within the predetermined range of positions.

* * * * *